Feb. 13, 1940. M. FIORITTO 2,190,446
STAIR TREAD
Filed Feb. 15, 1939 2 Sheets-Sheet 1
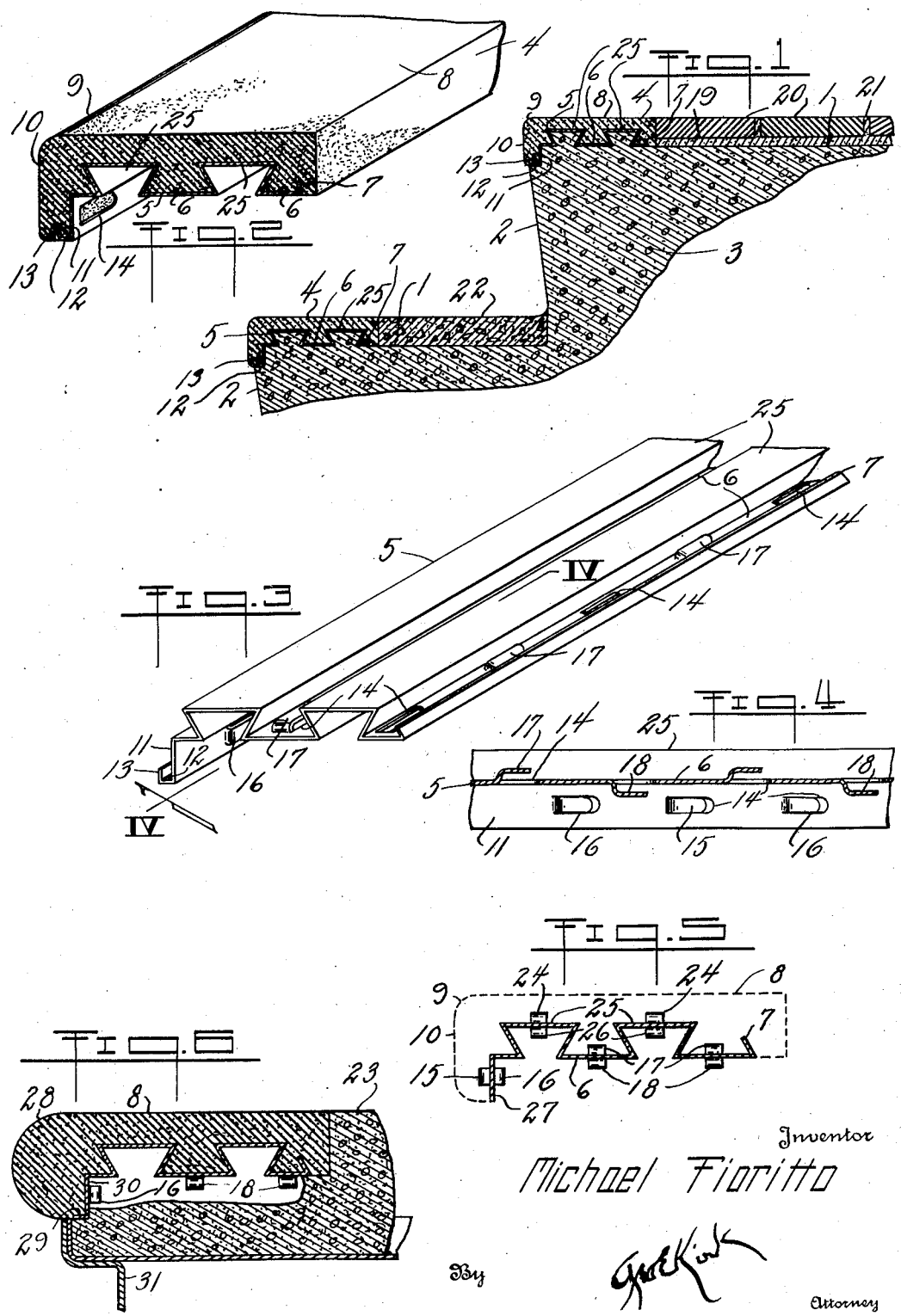
Inventor
Michael Fioritto
By [signature]
Attorney

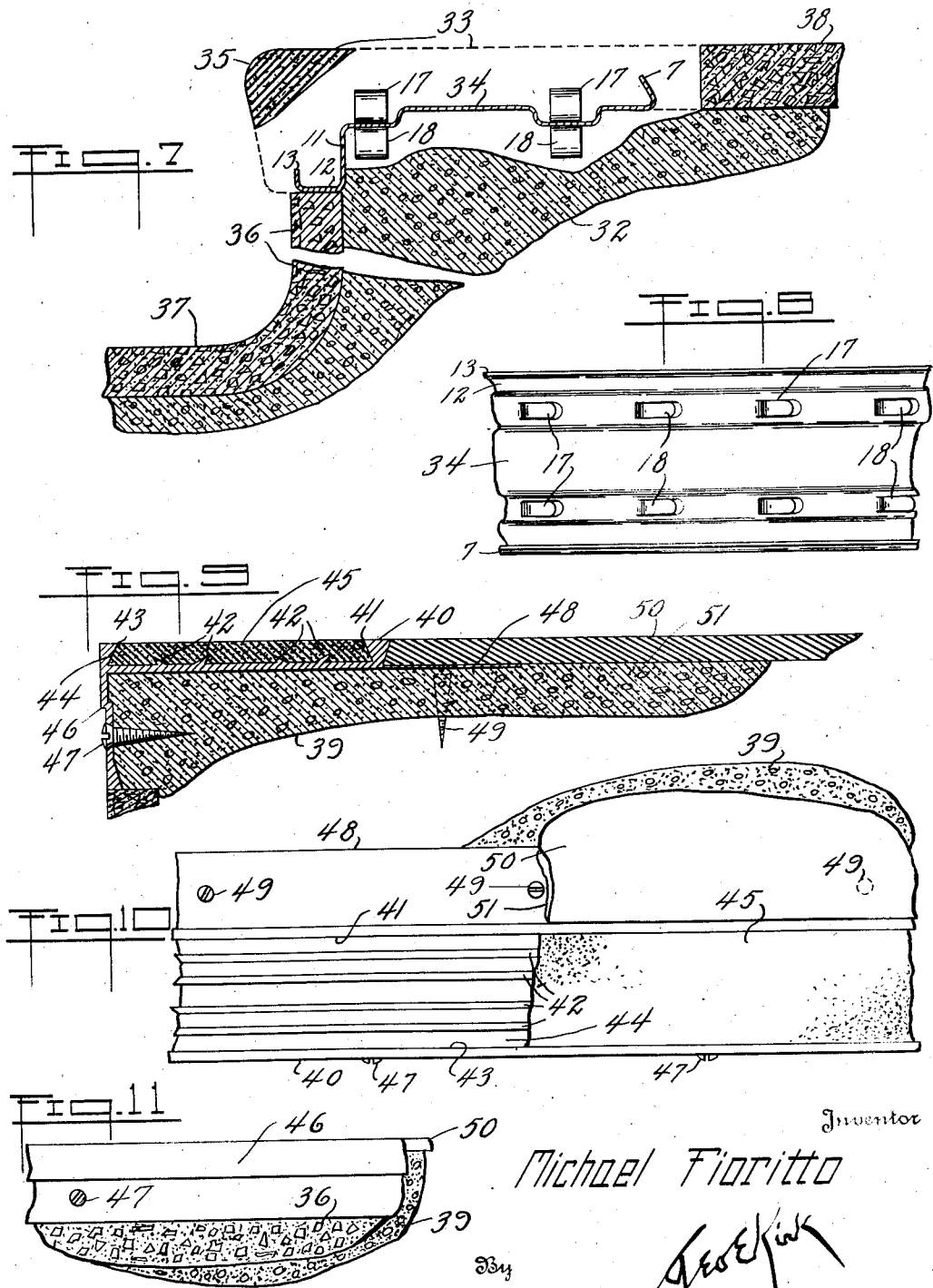

Patented Feb. 13, 1940

2,190,446

UNITED STATES PATENT OFFICE 2,190,446

STAIR TREAD

Michael Fioritto, Ottawa Hills, Ohio

Application February 15, 1939, Serial No. 256,441

4 Claims. (Cl. 72—96)

This invention relates to preformed slabs of tread type for stair noses, preferably of minor mass as to the ultimate step or tread.

This invention has utility when incorporated in plastic or cementitious surfaced nosed portions for steps, especially as reinforced and of abrasive or non-slip properties.

Referring to the drawings:

Fig. 1 is a fragmentary view in section of a pair of steps embodying features of the tread nose herein;

Fig. 2 is a perspective view in end section on an enlarged scale of the tread section of nose of Fig. 1;

Fig. 3 is a perspective view of the reinforcing back or strip for the section of Fig. 1;

Fig. 4 is a section on the line IV—IV, Fig. 3, showing the offset tongue features of the backer for the slab or unit;

Fig. 5 is a cross section of a unit having features of the concealed metal reinforcement or back in variation from that of Fig. 3;

Fig. 6 is a view similar to Fig. 5 in further adaptation of this unit in plastic mounting;

Fig. 7 is a fragmentary view of a reinforcement in position for providing the backing for a tread section and edge or nose, parts being broken away;

Fig. 8 is a plan view of the reinforcement section or metal of Fig. 7;

Fig. 9 is a section of a tread having a cementitious facing in a metal backing anchored as adapted for preformed sheet covering such as linoleum;

Fig. 10 is a fragmentary plan view of the installation of Fig. 9; and

Fig. 11 is a view of the showing of Fig. 9 from the left.

Stairway having deck portions 1 and riser portions 2 may have the body or back 3 of cement. In carrying out this invention, there is preformed a slab or relatively minor section of plastic 4 on sheet metal backer or base 5, herein shown as having dovetails 6 extending longitudinally thereof with supplemental anchorage 7 in parallel therewith. This backer is as to surface portion 8 extending to edge or nose 9 having depending cement trim front face 10 reinforced by depending portion 11 of the backer, having terminus 12 with offset tongue 13 upwardly rising and embedded remote from and parallel to the portion 7.

Along these ways of this reinforcing back, key openings 14 have struck out therefrom tongues 15 toward the drop portion 10 and anchorage portion from this unit oppositely therefrom has tongue portion 16. Additionally, as to the face 8 there is projecting theretoward from these openings 14 tongues 17 as reinforcing anchorage for this surface portion 8. Supplemental thereto, tongue portions 18 project away from the portion 8 as to the sheet metal backer 5 for effective anchorage in the cement 3 or supplemental plastic portion 19 which may be the rough sub-coat for tile 20 as having finished filler 21 therewith in completing the floor surface extending from the tread edge providing portion 8, 9. This tread unit or section, instead of being placed with tile, may have a cast finish surface as terrazzo 22 or may be in conjunction with other plastic cast mass as cement 23 (Fig. 6).

In connection with this anchorage for the relatively thin mass of the tread 8, there may be offset tongues 24 toward the face of the tread from the dovetails 25 (Fig. 5) with even reverse tongues 26. Depending backer portion as to the edge 9 may be in strip 27 independently of any offset or return bend of Fig. 3.

Again, surface 8 may be to edge 28 (Fig. 6) as a more generally rounded nose and such to terminate at ledge 29 from drop portion 30 of the reinforcing back. There is thus positioned this tread portion even as to steel riser 31 in a step.

This light gage or thickness for the plastic may be in the region of ¼ to ⅝ of an inch with such substantial in the body for the surface as well as in the thickness for the rounded or more abrupt nose. This end is obtained with adhesive attributes in the magnesite or magnesium chlorid cement for effective adherence with hardness properties enhanced even under changes of exposure conditions not only from wear but moisture due to the incorporation therewith of finely divided copper. This metallic copper up to 10 per cent of weight disseminated through the mass has reactant strength values to uphold against attack.

Furthermore, in this location adjacent the free edge of a step, importance arises for inclusion therewith of non-slip properties. To this end, ingredients with this Sorel of magnesite cement having the copper incorporated therewith advantageously also include aluminum oxid as the abrasive agent. There is thus provided a wear surface of non-slip properties which may be attractively set up even in a range of color schemes in keeping with the stairway, flooring, tile, terrazzo, cement, or other combinations.

Cement body 32 (Fig. 7) herein is support for preformed copper carrying abrasive surface 33 of cementitious or plastic on backing 34 of sheet metal reinforcement. This tread face 33 extends to nose 35. This sheet metal backing 34 may desirably be of non-corrosive or rustless steel. As herein shown, riser 36 is from terrazzo tread 37 therebelow. The abrasive and copper carrying tread slab 33 may extend from terrazzo 38, whether floor or the additional part of an intermediate step.

On tread foundation or step 39 (Fig. 9) may be located metal back unit 40 having overhang margin portion 41 and upstanding tang portions 42 in diverging pairs, with front overhang 43. In pocket 44 thus formed may be the cementitious plastic 45 coacting as a unit therewith even in shallow form and it is effective non-slip in including the aluminum oxid as abrasive. From this body portion there is drop portion 46 from the nose through which screws 47 may pass at this exposed trim portion in effecting anchorage with the step body. From this pocket portion 44 may extend fin 48 for anchoring screws 49. Floor covering material 50 as linoleum, sheet rubber, or like substance, as preformed, may be trimmed and anchored therewith by adhesive plastic 51. Adhesive or plastic coating even as to cement 45 may in conjunction with the metal backgrounds hereunder be of asphalt or bituminous content.

What is claimed and it is desired to secure by United States Letters Patent is:

1. A tread unit comprising a cementitious tread face body portion, and parallel thereto a sheet metal anchorage and reinforcement portion opposite from the face, said latter portion having prong means extending into the cementitious portion short of the face, and additional prong means oppositely extending away from the face, said latter being effective as an anchorage for said unit in a base.

2. A tread section embodying a preformed cementitious face, and a metal reinforcement spaced from said face, said metal having parallel ribs on one side forming parallel grooves on the opposite side of said reinforcement, said ribs being in such proximity as to form parallel grooves on the same side thereof and therebetween, the grooves on the opposite side being in such proximity as to form parallel ribs therebetween, whereby the parallel ribs and grooves complementally register as anchoring means for the face and for a base upon which said section may be mounted.

3. A tread section embodying a cementitious body having a preformed cementitious face, and a metal reinforcement having parallel rib means extending into the body toward said face, said rib means having key anchorage in the body holding the body against shifting away from the reinforcement, there being openings providing ports through the reinforcement adjacent the rib means for additional effective anchoring of the body with the reinforcement.

4. A tread section embodying a cementitious body having a preformed cementitious face, and a metal reinforcement spaced from the face, said reinforcement having a rib extending toward said face in providing key anchorage with the body, and a fin extending outward from the rib away from the body as an extension, said extension being in the plane of the reinforcement, and anchoring screw means engaging said fin to anchor the section with a base.

MICHAEL FIORITTO.